United States Patent
Rajkumar (10) Patent No.: US 9,495,482 B2
(45) Date of Patent: Nov. 15, 2016

(54) COMPUTER METHOD AND APPARATUS FOR CREATING SKETCH GEOMETRY

(75) Inventor: Parapura T. Rajkumar, Cambridge, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 773 days.

(21) Appl. No.: 12/695,046

(22) Filed: Jan. 27, 2010

(65) Prior Publication Data

US 2011/0185272 A1  Jul. 28, 2011

(51) Int. Cl.
| | | |
|---|---|---|
| G06F 17/00 | (2006.01) | |
| G06F 17/20 | (2006.01) | |
| G06F 17/21 | (2006.01) | |
| G06F 17/22 | (2006.01) | |
| G06F 17/24 | (2006.01) | |
| G06F 17/25 | (2006.01) | |
| G06F 17/26 | (2006.01) | |
| G06F 17/27 | (2006.01) | |
| G06F 17/28 | (2006.01) | |
| G06F 3/048 | (2013.01) | |
| G06F 17/50 | (2006.01) | |

(52) U.S. Cl.
CPC ........... *G06F 17/50* (2013.01); *G06F 2217/06* (2013.01)

(58) Field of Classification Search
CPC ...................... G06F 17/50; G06F 17/06; G06F 2217/06
USPC ......................................... 715/234, 674, 764
See application file for complete search history.

(56) References Cited

U.S. PATENT DOCUMENTS

| | | | | |
|---|---|---|---|---|
| 5,237,647 | A  * | 8/1993 | Roberts et al. | ............... 715/723 |
| 6,063,128 | A  * | 5/2000 | Bentley et al. | ............... 715/964 |
| 6,308,144 | B1 * | 10/2001 | Bronfeld | ................. G06T 19/20 345/213 |
| 6,417,865 | B1 * | 7/2002 | Bou | ............................. 345/619 |
| 7,444,195 | B2 * | 10/2008 | Smith | ................. G06F 17/5095 345/420 |
| 7,639,267 | B1 * | 12/2009 | Desimone | ........... G06F 17/5086 345/420 |
| 2002/0183986 | A1 * | 12/2002 | Stewart et al. | .................... 703/2 |
| 2003/0067487 | A1 * | 4/2003 | Kohls | ..................... G06F 17/50 715/764 |
| 2003/0071810 | A1 * | 4/2003 | Shoov et al. | ................. 345/420 |
| 2007/0273688 | A1 * | 11/2007 | Chen | ...................... G06T 17/20 345/420 |
| 2007/0285425 | A1 * | 12/2007 | Bae | ........................ G06F 17/50 345/427 |

OTHER PUBLICATIONS http://books.mozdev.org "Chapter 7. Extending the UI with XBL", retrieved by web.archive.org on Feb. 16, 2009, http://web.archive.org/web/20090216124244/http://books.mozdev.org/html/mozilla-chp-7.html.*
CADENAS Brochure, "Find, Control & Reuse Your Standard Parts, with CADENAS Parts Management," Sep. 2009.

(Continued)

*Primary Examiner* — Manglesh M Patel
*Assistant Examiner* — Nicholas Hasty
(74) *Attorney, Agent, or Firm* — Hamilton, Brook, Smith & Reynolds, P.C.

(57) ABSTRACT

A sketch tool for CAD systems extends geometric templates. A markup type language file (e.g., XML file) is used to define an additional basic geometric shape. The file schema also enables definition of constraints and drag points of the subject shape.

13 Claims, 6 Drawing Sheets

(56) References Cited

OTHER PUBLICATIONS http://books.mozdev.org "Chapter 7. Extending the UI with XBL", retrieved from internet on Mar. 4, 2011.
Izquierdo, P., et al., "An Annotation Tool for Enhancing the User Interface Generation Process for Services," 19$^{th}$ Int. Crimean Conference, pp. 372-374 (Sep. 14-18, 2009).
Sutherland, I.E., "American Federation of Information Processing Societies: Sketchpad a Man-Machine Graphical Communication System," Proceedings of the Spring Joint Computer Conference, 23: 329-346 (1963).
Mun, D., et al., "A set of Standard Modeling Commands for the History-based Parametric Approach," Computer Aided Design 35(13): 1171-1179 (2003).
Nemetschek, "Allplan/Allplot Version 12 Handbuch Basis, Erweiterung 3-Kap. 3 Variantenkonstruktion," (1996).
European Search Report for corresponding European patent application No. EP 11 15 1599, dated May 27, 2015.

* cited by examiner

FIG. 6

COMPUTER METHOD AND APPARATUS FOR CREATING SKETCH GEOMETRY

BACKGROUND OF THE INVENTION

Computer-Aided Design (CAD) relates to software for constructing and manipulating complex three-dimensional (3D) models. A number of CAD systems and programs are offered in the marketplace that construct 3D models and enable engineers to design parts and assemblies, such as the product provided by Dassault Systèmes SolidWorks Corporation under the trademark SOLIDWORKS.

A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters. The parametric nature of a CAD system enables constraints (e.g., relationships between features) to influence the geometric representation of a model.

A CAD system manages models of objects, which are stored in one or more electronic files. The CAD system includes graphic tools for representing the modeled objects to design engineers; these tools may be dedicated to the display of both simple and complex objects. The graphical user interface (GUI) of the CAD system plays an important role in efficiently designing and manipulating a model.

A model of a part consists of features, which refer to the building blocks of the part. A feature may begin as a 2D sketch and then be extruded to become a boss or a hole, for example. A sketch, as is familiar to those skilled in the art, is a collection of lines and other 2D or 3D objects on a plane or face that forms the basis for a feature such as a base or a boss. A 3D sketch is a non-planar object and can be used to guide a sweep or loft, for example.

Not all features are based on a sketch; other features may be applied to a part. For example, a fillet feature when applied to a part rounds one or more edges, a chamfer feature creates a beveled edge, and a draft feature adds an angle to one or more faces in a part.

Constructing a model in a CAD system may entail creating a feature from a 2D or 3D sketch. The sketch consists of geometry, such as points, lines, and curves. Dimensions are added to the sketch to define the size and location of the geometry.

In addition to allowing a design engineer to create a sketch by drawing lines to create a shape, a CAD system provides sketch templates from which a design engineer initiates or builds a sketch. Each sketch template specifies a respective primitive shape or element (e.g., a circle or a rectangle).

A drawback of a number of CAD systems is the lack of a wider variety of geometric primitives. For example, a CAD system may provide line, circle, and rectangle primitives, but not a customized profile. Another drawback, affecting how efficiently a model can be created, is that primitives, including blocks that allow the grouping of sketch entities, although re-usable, have pre-determined sizes and cannot be manipulated or modified.

Macros are used to automate redundant and simple tasks. As used in the SolidWorks® application, macros are a means in which shapes can be defined by recording keyboard commands, for example. In general, macros are not interactive because the recorded commands do not have variable capabilities. Macros and blocks allow shapes to be defined, stored, and reused. However, neither of these solutions enables user-defined shapes to be modified or manipulated interactively.

SUMMARY OF THE INVENTION

The present invention addresses the short comings of the prior art. In particular, embodiments of the present invention provide computer methods and apparatuses for sketching in CAD systems. Such computer-implemented methods and apparatuses comprise:

providing a set of geometric templates stored in a computer memory, each geometric template specifying a respective basic geometric shape;

an extender enabling end-user extension of the set of geometric templates, including enabling end-user definition and creation of an additional basic geometric shape; and in response to end-user application of the extended set of geometric templates, generating on a computer display a sketch of a real-world object to serve as a basis of a feature in a CAD model representing the real-world object.

In embodiments, the step of enabling end-user extension includes providing a markup type language schema in which the end-user defines the additional basic geometric shape. In an embodiment the markup type language is XML (Extensible Markup language).

Further a geometric template in the set may specify one or more constraints and a drag point or any combination thereof. The markup type language schema may further enable the end-user to define constraints and/or a drag point.

In embodiments, the drag point may be data driven.

In accordance with the present invention, the sketch enables building (or initiating) of a computer-aided design model representing the real-world object.

In some embodiments, the set of geometric templates is formed of one or more geometric templates, and the extender enables end-user extension of a set of one template.

Advantages include the flexibility of creating many customized geometric shapes or elements without depending on a software vendor to include the shapes in the vendor's application. Another advantage is the efficiency that results from creating a geometric template once and re-using it over and over with minimum effort while dynamically changing aspects of a shape defined by the geometric template. Yet another advantage is that the language for specifying the customized shapes or elements is very easy to learn and use. The present invention is extensible and end-users are free to add their own XML files and specify their own primitive sketch entities and respective drag behavior. This has the added benefit that even non-developers can edit/modify the XML files or add new XML files and verify behavior of subject sketch entities instantaneously. In other CAD products one would need to make code changes and compile and execute the changed code to verify the new behavior, which could consume considerable time and expertise.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of all patents, published applications, and references cited herein are incorporated by reference in their entirety.

Sketching is a standard way of beginning to create a feature of a model in a CAD system. The inventive concept described herein extends sketching capabilities by allowing an end-user to define and customize geometric templates. In addition, customized geometric templates enable dynamic modifications to aspects of that which the customized geometric templates define.

The present invention enables end-users to access a wider variety of geometric primitives than are generally available in CAD systems by allowing end-user definition and customization of data-driven geometric templates. In general, in a CAD System such as SolidWorks® software (developed by Dassault Systèmes SolidWorks Corporation), each sketch entity has a unique set of commands and a corresponding behavior. The behavior is implemented in the program code of the CAD system. Thus, when an end-user is creating a rectangle, a slot, a triangle, or a center-point arc, the CAD system identifies the appropriate sketch entity, and the program code executes the appropriate command operations.

In embodiments of the present invention, an end-user can create a geometric template by specifying primitives, constraints, and drag points according to an easily understood schema. A drag point is data driven, meaning that once the drag point is defined, an end-user can select the drag point and modify the drag point's location using a mouse or similar control device. Thus, drag points are a means to manipulate and adjust the size or dimensions of geometry defined in a sketch that is derived from a custom geometric template.

Figure 1:
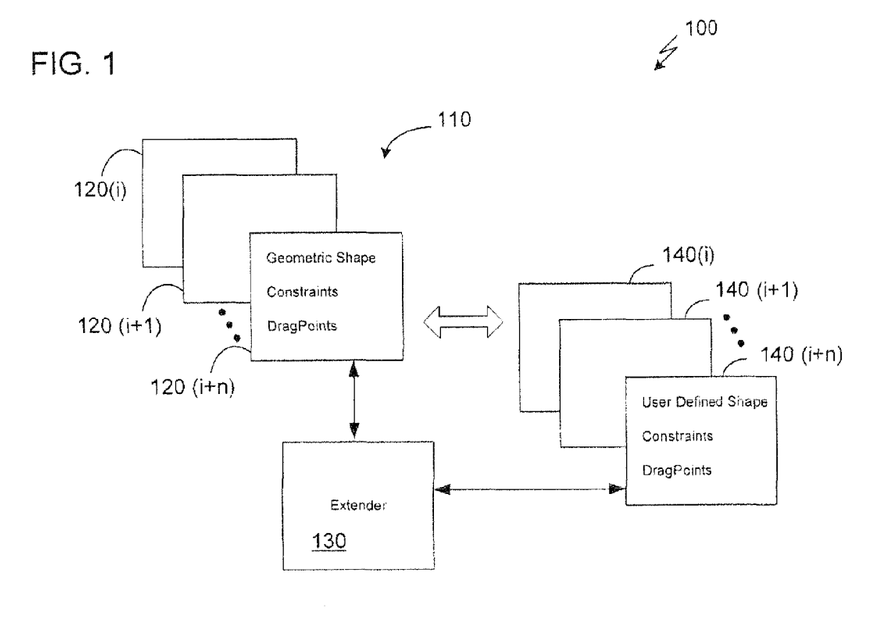
FIG. 1 is a schematic view of an embodiment of the present invention.

With reference to FIG. 1, a sketch tool 100 embodying the present invention is illustrated. Sketch tool 100 may be a built-in or an add-on function of a CAD system, or otherwise configured with respect to a CAD system. The sketch tool 100 generates a two-dimensional or three-dimensional sketch of a component of an object from which the CAD system models the object.

Sketch tool 100 includes (a) an initial set 110 of geometric templates 120(i), 120(i+1), . . . 120(i+n) (generally referenced as 120), and (b) an extender 130. Each geometric template 120 in the initial set 110 specifies a respective geometric shape, one or more constraints, and one or more drag points. The extender 130 enables an end-user to extend the initial set 110 of geometric templates 120 without seeking the aid of a person knowledgeable in writing programming code. In particular, extender 130 enables an end-user to define and create a new or additional geometric shape. The geometric shape could be a primitive, or in general a basic geometric shape. Or the geometric shape could be quite complex. Extender 130 also enables an end-user to define constraints and/or drag points for the new end-user defined geometric shape. In turn, extender 130 produces a corresponding custom geometric template 140(i) that specifies the end-user defined custom geometric shape together with any constraints and drag points. Further additional custom geometric templates 140(i+1), . . . 140(i+n) (referenced as 140 generally) may be similarly generated in response to end-user operation of extender 130. In this way, extender 130 provides for the extension of initial set 110 of geometric templates 120 to include custom geometric templates 140.

The sketch tool extender 130 in an embodiment is an environment for creating XML code (and hence XML files) that is read and infers appropriate behavior. The XML code can declare primitives such as points, lines, arcs, and circles within the programming construct delineated by <Primitives>. Each declared point, line, arc, circle, etc. is assigned (a) a respective unique identification name in the form ID=integer, and (b) pertinent attribute values (e.g., location, length, start point, end point, and radius). A given XML file may also declare drag points and constraints within the <Dragpoints> and <Constraints> constructs, respectively, each with respective "Id", attributes, and instructions as needed relative to the declared <Primitives> portion of the custom template. The following illustration exemplifies the XML schema described as an embodiment. Other similar markup language schemas and other languages are suitable.

To illustrate with an example, consider a user-defined custom geometric template 140(i+n) that creates a rectangle by specifying diagonally positioned corners (e.g., a bottom left corner and a top right corner). In an embodiment, the XML code describing or otherwise supporting the rectangle custom geometric template 140(i+n) is as follows:

```
<SketchEntityTool Name="cornerrectangle">
    <Primitives>
        <Point Id="1" Value="0,0,0"/>
        <Point Id="2" Value="0.1,0,0"/>
        <Point Id="3" Value="0.1,0.1,0"/>
        <Point Id="4" Value="0,0.1,0"/>
        <Line Id="5" StartPointId="1" EndPointId="2"/>
        <Line Id="6" StartPointId="2" EndPointId="3"/>
        <Line Id="7" StartPointId="3" EndPointId="4"/>
        <Line Id="8" StartPointId="4" EndPointId="1"/>
    </Primitives>
    <DragPoints>
        <DragPoint Id="1"/>
        <DragPoint Id="3"/>
    </DragPoints>
    <Constraints>
        <Parallel First="5" Second="7"/>
        <Parallel First="8" Second="6"/>
        <Horizontal First="5"/>
        <Vertical First="8"/>
    </Constraints>
    <AutoDimensions>
```

-continued

```
         <Dimension First="6" Second="8"/>
         <Dimension First="7" Second="5"/>
       </AutoDimensions>
    </SketchEntityTool>
```

Figure 2:
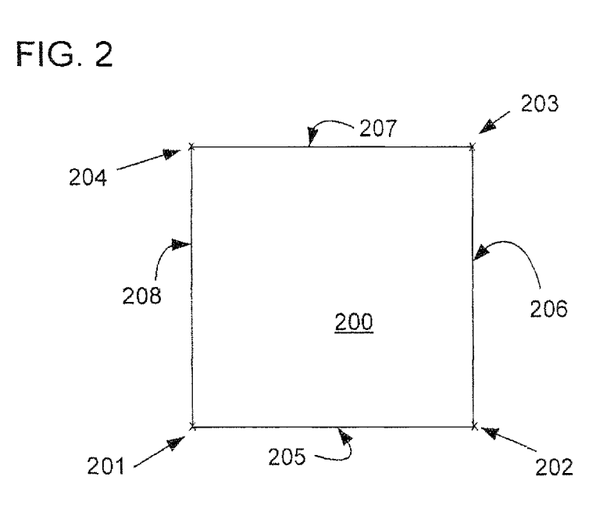
FIG. 2 is an illustration of an example, custom geometric template specifying a rectangle primitive using an embodiment of the present invention.

In the foregoing example, four points (illustrated as 201, 202, 203, 204 in FIG. 2) and four lines (205, 206, 207, 208 in FIG. 2) connecting the points have been described as a user-defined primitive geometric shape, illustrated as a rectangular sketch 200 in FIG. 2. Also identified are parallel, horizontal, and vertical constraints that restrict the subject shape to be rectangular. Further the foregoing XML code identifies two drag points 201, 203, namely the bottom left corner and top right corner of the rectangle sketch 200. The drag points 201, 203 are data driven such that the drag points change location as input is received. This enables a rectangle created from the rectangle custom geometric template 140 (i+n) to be dynamically modified.

Subsequent application and operation of the rectangle custom geometric template 140(i+n) may create a respective sketch 200 as illustrated in FIG. 2 as follows:

1) Based on a selected cursor location, all the necessary primitive entities (i.e., points 1, 2, 3, 4 and lines 5, 6, 7, 8 specified in the rectangle custom geometric template 140(i+n)) are created. Specifically, Point Id="1" of the template 140(i+n) code above is created and illustrated as corner point 201 in FIG. 2. Point Id="2" in the above XML code is created and illustrated as corner point 202 in FIG. 2. Point Id="3" in the XML code is created and illustrated as corner point 203 in FIG. 2. And Point Id="4" in the XML code is created and illustrated as corner point 204 in FIG. 2.

Line Id="5" in the above XML code is created and illustrated in FIG. 2 as line 205. Line Id="6" in the XML code is created and illustrated in FIG. 2 as line 206. Line Id="7" in the XML code is created and illustrated as line 207 in FIG. 2. Line Id="8" in the XML code is created and illustrated as line 208 in FIG. 2.

A selected cursor location becomes the location of the first drag point 201, and therefore, is positioned as the first point (i.e., the bottom left corner of the rectangle).

2) The end-user may move the drag point 201, thereby modifying the dimensions of rectangle 200. Alternatively, the end-user may select a second drag point 203, which is the upper-right corner of the rectangle 200, and drag the second drag point according to the rectangle custom geometric template 140(i+n) constraints. That is, the code defined constraints maintain the horizontal and vertical orientations of Line Ids 5 and 8 (lines 205 and 208 in FIG. 2), respectively, and ensure that Line Ids 5 and 7 (lines 205 and 207), and Line Ids 8 and 6 (lines 208 and 206) remain parallel to one another.

3) The end-user may then continue to move either drag point 201, 203. Once all drag points have been placed in the desired locations, the sketch entity (in this example rectangle 200) is complete. An embodiment allows the end-user to re-select a drag point and modify the sketch as long as the sketch entity exists.

Those of ordinary skill in the art may easily write the underlying code that implements the XML functions described herein. For example, a drag point is positioned at the cursor location and is updated as new location input is received from the cursor-control device. Constraint and autodimension XML functions can simply call respective functions in the CAD system that embodies the present invention.

Figure 3:
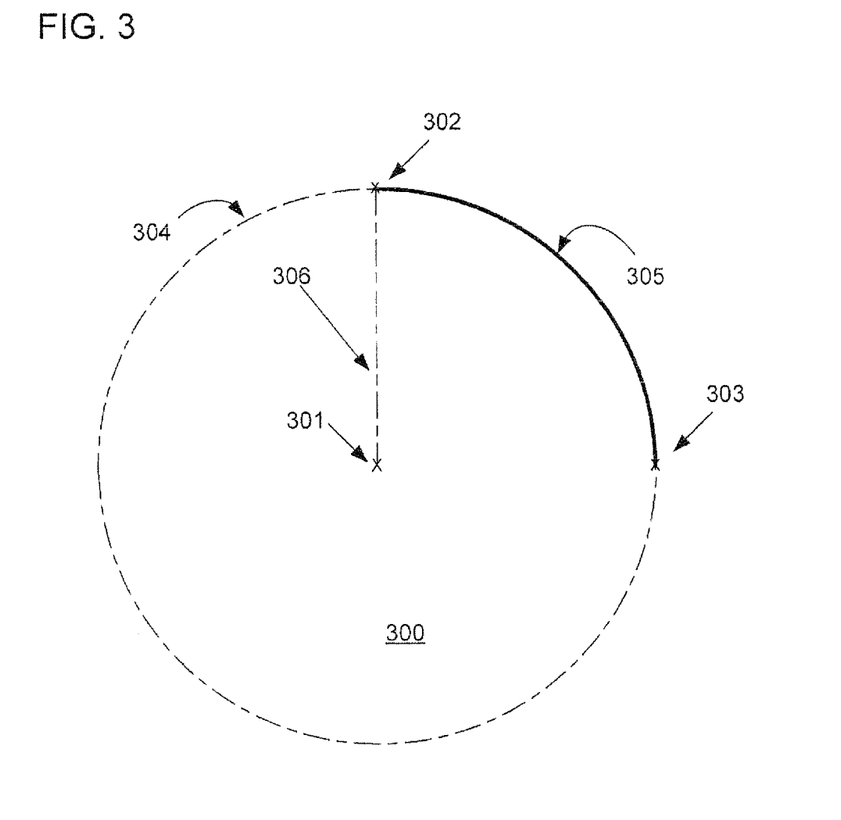
FIG. 3 is an illustration of an example custom geometric template specifying an arc primitive using an embodiment of the present invention.

Illustrated in FIG. 3, is a center arc sketch 300. Generally, to create a center arc geometry within a sketch, three points are specified—a center point 301, a start point 303, and an endpoint 302. The start point 303 identifies the radius of the circular arc with respect to a center point 301. The end point 302 specifies the arc length of the center arc sketch 300. The following XML code creates center arc sketch 300:

```
<SketchEntityTool Name="centerarc">
   <Primitives>
      <Point Id="1" Value="0,0,0" Hidden="false" Construction="true"/>
      <Point Id="2" Value="0,0.1,0"/>
      <Point Id="3" Value="0.1,0,0"/>
      <Circle Id="4" CenterPointId="1" RadiusPointId="2"
         Construction="true"/>
      <Arc Id="5" CenterPointId="1" StartPointId="3" EndPointId="2"/>
      <Line Id="6" StartPointId="1" EndPointId="2"
         Construction="true"/>
   </Primitives>
   <Constraints>
      <Coincident First="1" Second="4"/>
      <Coincident First="1" Second="5"/>
      <Distance First="2" Second="4" Value="0"/>
   </Constraints>
   <DragPoints>
      <DragPoint Id="1">
         <Hide Id="5"/>
      </DragPoint>
      <DragPoint Id="2"/>
      <DragPoint Id="3">
         <Show Id="5"/>
         <Delete Id="4"/>
         <Delete Id="6"/>
      </DragPoint>
   </DragPoints>
   <AutoDimensions>
      <Dimension First="5"/>
   </AutoDimensions>
</SketchEntityTool>
```

As can be understood from the foregoing XML code, three drag points 301, 302, 303, initially identified via Point Ids 1, 2, and 3, are needed to fully define the custom center arc sketch 300. The XML code also specifies additional instructions, such as auto-dimensioning the arc identified by Arc Id=5 and illustrated as arc 305 in FIG. 3. Other additional instructions include:

Distance First="2" Second="4" Value="0" to ensure that the second drag point 302 remains on the perimeter of circle 304.

Hide Id="5" to hide the arc 305 and only show the center point 301, and as guides, the circle 304 and radius line 306 using a construction line font.

Show Id="5" to show the arc 305 while placing the third drag point 303.

Delete Id="4" and Delete Id="6" to delete circle 304 and line 306, respectively, which are no longer needed as guides while placing the third drag point 303.

Dimension First="5" to dimension the radius 306 of the arc 305, which is also the radius of the circle 304.

Figure 4:
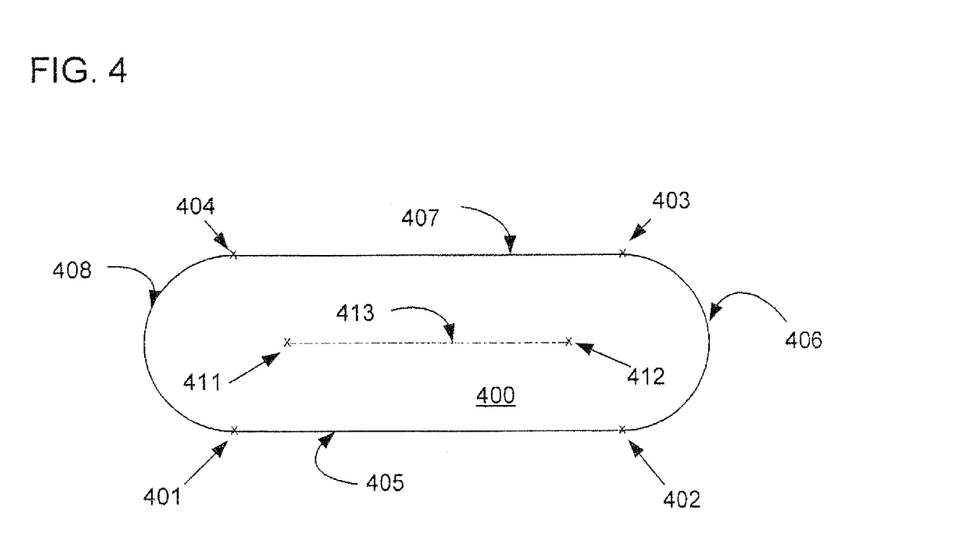
FIG. 4 is an illustration of an example custom geometric template specifying a center line slot primitive using an embodiment of the present invention.

Referring now to FIG. 4, another often-used sketch entity is a centerline slot 400, which may be defined as follows:

```
<SketchEntityTool Name="centerlineslot">
   <Primitives>
      <Point Id="1" Value= "0,0,0"/>
      <Point Id="2" Value= "2,0,0"/>
      <Point Id="3" Value= "2,2,0"/>
      <Point Id="4" Value= "0,2,0"/>
      <Point Id="9" Value= "3,1,0"/>
      <Point Id="10" Value= "−1,1,0"/>
```

```
    <Point Id="11" Value= "0,1,0"/>
    <Point Id="12" Value= "2,1,0"/>
    <Line Id="5" StartPointId="1" EndPointId="2"/>
    <Arc Id="6" StartPointId="2" EndPointId="3" MidPointId="9"/>
    <Line Id="7" StartPointId="3" EndPointId="4"/>
    <Arc Id="8" StartPointId="4" EndPointId="1" MidPointId="10"/>
    <Line Id="13" StartPointId="11" EndPointId="12"
    Construction="true"/>
</Primitives>
<DragPoints>
    <DragPoint Id="11">
        <Hide Id="5"/>
        <Hide Id="6"/>
        <Hide Id="7"/>  ---------------> Hide primitives except the
        centerline
        <Hide Id="8"/>
    </DragPoint>
    <DragPoint Id="12"/>
    <DragPoint Id="3">
        <Show Id="5"/>
        <Show Id="6"/>
        <Show Id="7"/>
        <Show Id="8"/>
    </DragPoint>
</DragPoints>
<Constraints>
    <Parallel First="5" Second="7"/>
    <Parallel First="13" Second="7"/>
    <Tangent First="5" Second="6"/>
    <Tangent First="6" Second="7"/>
    <Tangent First="7" Second="8"/>
    <Tangent First="8" Second="5"/>
    <Coincident First="11" Second="8"/>
    <Coincident First="12" Second="6"/>
</Constraints>
</SketchEntityTool>
```

Operation of the foregoing custom geometric template 140(i+n) when applied by an end-user and as shown in FIG. 4 is as follows:

1) A center line 413, drawn using the construction line font, is placed or otherwise located in sketch 400 by the points 411 and 412.

2) While placing the center line 413, centerline slot sketch 400 only renders the center line 413 due to XML instructions "Hide Id=n" in the preceding XML code.

3) While dragging the third drag point 403, sketch 400 shows all the slot primitives as a result of the XML instructions "Show Id=n" in the preceding XML code.

4) Points identified as 11, 12, and 3 in the above XML code, and labeled 411, 412, and 403 in FIG. 4, are data driven drag points and can be modified dynamically using an input device to change the points' locations, thereby changing the locations of other primitives in the centerline slot sketch 400.

5) The endpoints 411, 412 of center line 413 remain aligned to the center of arcs 408, 406 as a result of the instructions <Coincident First="11" Second="8"/> and <Coincident First="12" Second="6"/>.

In the foregoing examples, XML commands include commands to specify primitives, to show and hide the primitives, to create constraints, and to automatically dimension primitives. These commands may be extended by one of ordinary skill in the art to include other needed capabilities.

Figure 5:
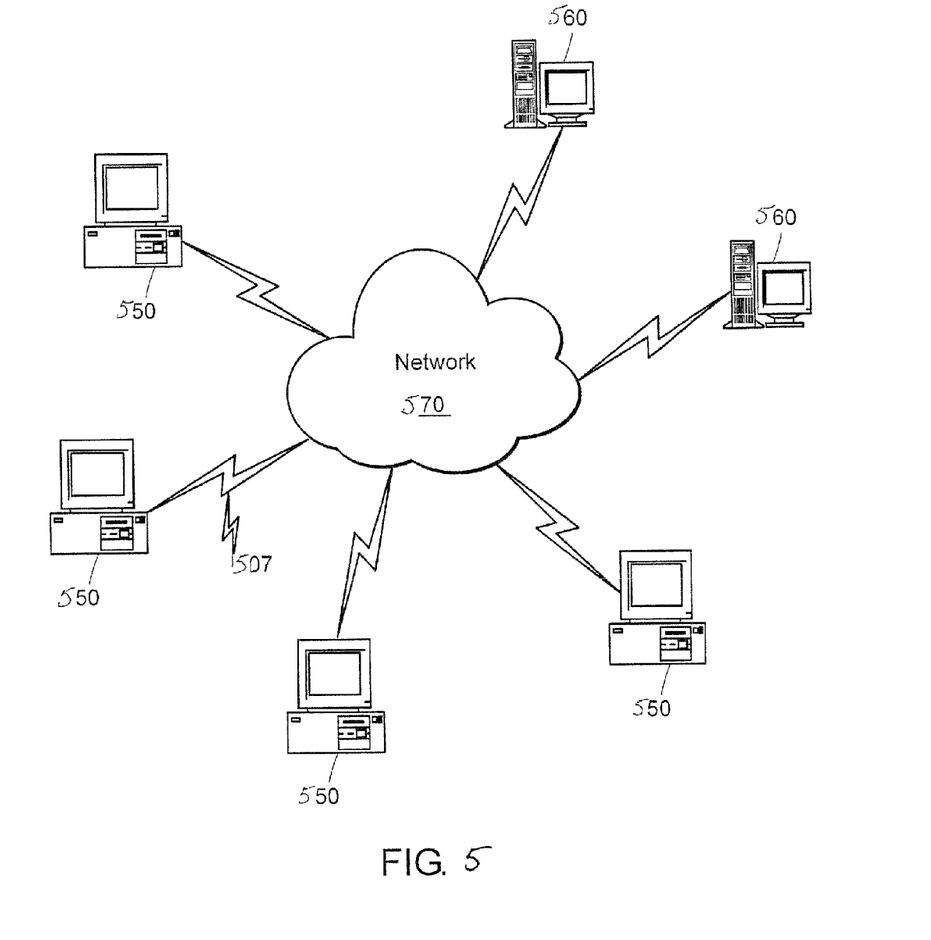
FIG. 5 is a schematic view of a computer network in which embodiments of the present invention may be deployed.

FIG. 5 illustrates a computer network or similar digital processing environment in which the present invention may be implemented.

Client computer(s)/devices 550 and server computer(s) 560 provide processing, storage, and input/output devices executing application programs and the like. Client computer(s)/devices 550 can also be linked through communications network 570 to other computing devices, including other client devices/processes 550 and server computer(s) 560. Communications network 570 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
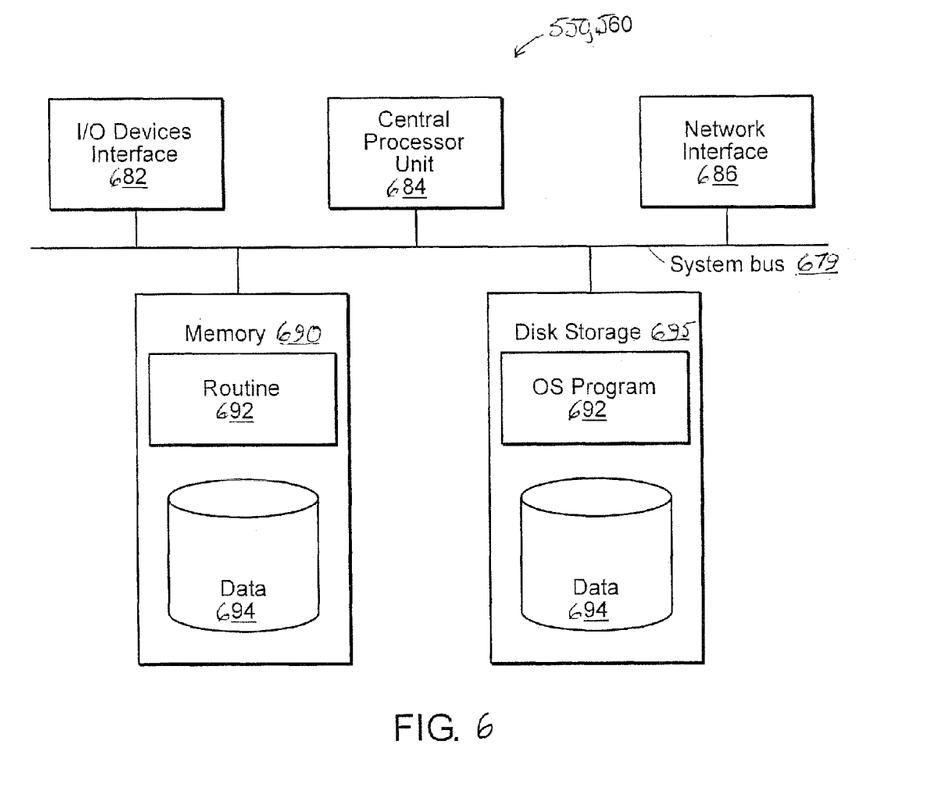
FIG. 6 is a block diagram of a computer node in the network of FIG. 5.

FIG. 6 is a diagram of the internal structure of a computer (e.g., client processor/device 550 or server computers 560) in the computer system of FIG. 5. Each computer 550, 560 contains system bus 679, where a bus is a set of hardware lines used for data transfer among the components of a computer or processing system. Bus 679 is essentially a shared conduit that connects different elements of a computer system (e.g., processor, disk storage, memory, input/output ports, and network ports) that enables the transfer of information between the elements. Attached to system bus 679 is I/O device interface 682 for connecting various input and output devices (e.g., keyboard, mouse, displays, printers, speakers, etc.) to the computer 550, 560. Network interface 686 allows the computer to connect to various other devices attached to a network (e.g., network 570 of FIG. 5). Memory 690 provides volatile storage for computer software instructions 692 and data 694 used to implement an embodiment of the present invention (e.g., sketch tool 100, extender 130, and supporting XML file schema and code described herein). Disk storage 695 provides non-volatile storage for computer software instructions 692 and data 694 used to implement an embodiment of the present invention. Central processor unit 684 is also attached to system bus 679 and provides for the execution of computer instructions.

In one embodiment, the processor routines 692 and data 694 are a computer program product (generally referenced 692), including a computer readable medium (e.g., a removable storage medium such as one or more DVD-ROM's, CD-ROM's, diskettes, tapes, etc.) that provides at least a portion of the software instructions for the invention system. Computer program product 692 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 507 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 692.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 692 is a propagation medium that the computer system 550 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

For example, the inventive concept can be used in various CAD Systems and other two dimensional and three dimensional products that create geometry from simple primitives.

What is claimed is:

1. A computer-implemented method of sketching a real-world object, comprising:
   providing a set of geometric templates stored in a computer memory in a computer-aided design (CAD) system, each geometric template in the set specifying a respective basic geometric shape from which a user initiates or builds at least one sketch entity in a 2D or 3D sketch in the CAD system, and different geometric templates in the set specifying different basic geometric shapes of sketch entities;
   enabling end-user extension of the set of geometric templates in the CAD system, including enabling end-user definition and creation of an additional basic geometric shape from which the user initiates or builds additional sketch entities in sketches using a markup type language schema in which the end-user states the definition of the additional basic geometric shape and the definition includes one or more constraints and a drag point, a corresponding geometric template of the additional basic geometric shape being added to the set of geometric templates in the CAD system so as to result in a customized extended set of geometric templates stored in the computer memory and reusable in the CAD system to construct different CAD models; and
   in response to end-user application of the extended set of geometric templates, generating on a computer display a sketch of a real-world object to serve as a basis of a feature in a CAD model representing the real-world object.

2. A method as claimed in claim 1 wherein a geometric template in the set further specifies any combination of one or more constraints and a drag point.

3. A method as claimed in claim 1 wherein the markup type language is XML.

4. A method as claimed in claim 1 wherein the drag point is data driven.

5. A method as claimed in claim 1 wherein the sketch enables building the CAD model representing the real-world object.

6. A computer apparatus for sketching a real-world object, comprising:
   a set of initial geometric templates stored in a computer memory in a computer-aided design (CAD) system, wherein each initial geometric template specifies a respective basic geometric shape from which a user initiates or builds at least one sketch entity in a 2D or 3D sketch in the CAD system, and different initial geometric templates in the set specifying different basic geometric shapes for sketch entities; and
   an extender executable by a processor coupled to the memory and enabling end-user extension of the set of initial geometric templates in the CAD system, the extender (i) enabling end-user customized definition and creation of an additional basic geometric shape from which the user initiates or builds an additional sketch entity using a markup type language schema in which the end-user states the definition of the additional basic geometric shape and the definition includes one or more constraints and a drag point, and (ii) adding a corresponding geometric template of said additional basic geometric shape to the set of initial geometric templates stored in the memory, resulting in an end-user customized extended set of geometric templates in the CAD system; and
   in response to application of the extended set of geometric templates, the extender generating a sketch of a real-world object, the sketch being output for display and serving as a basis of a feature in a CAD model representing the real-world object.

7. The computer apparatus as claimed in claim 1 wherein the markup type language is XML.

8. A computer apparatus as claimed in claim 6 wherein the drag point is data driven.

9. The computer apparatus as claimed in claim 6 wherein the drag point changes location in response to input from a computer input device.

10. The computer apparatus as claimed in claim 6 wherein the sketch enables initiation of the CAD model representing the real-world object.

11. A computer program product for implementing a sketch tool, the computer program product comprising:
    a computer readable storage medium having computer program instructions stored thereon, the computer program instructions being configured such that upon execution by a computer, the computer program instructions implement a sketch tool in a computer-aided design (CAD) system including causing a computer to:
    provide at least one initial geometric template of the sketch tool, each provided initial geometric template specifying a respective basic geometric shape from which a user initiates or builds one or more sketch entities in a 2D or 3D sketch in the CAD system;
    enable customized definition and creation of an additional basic geometric shape from which the user initiates or builds additional sketch entities in 2D or 3D sketches in the CAD system using a markup type language schema in which the end-user states the definition of the additional basic geometric shape and the definition includes one or more constraints and a drag point, adding a corresponding geometric template of the additional basic geometric shape to the sketch tool so that the sketch tool provides in the CAD system the added corresponding geometric template in addition to each initial geometric template, and different geometric templates of the sketch tool specifying different basic geometric shapes; and
    in response to application of the corresponding geometric template of the additional basic geometric shape as provided by the sketch tool in addition to providing each initial geometric template as a result of the customized definition, generate a sketch of a real-world object, the sketch to serve as a basis of a feature of a CAD model representing the real-world object.

12. The computer program product as claimed in claim 11 wherein the drag point is data driven.

13. The computer program product as claimed in claim 11 wherein the drag point responds to input from a computer input device.

\* \* \* \* \*